United States Patent [19]
Zalar

[11] 3,800,205
[45] Mar. 26, 1974

[54] SUMP PUMP CONTROL SYSTEM

[75] Inventor: David R. Zalar, Wales, Wis.

[73] Assignee: Cutler-Hammer, Inc., Milwaukee, Wis.

[22] Filed: May 15, 1973

[21] Appl. No.: 360,525

[52] U.S. Cl............... 318/482, 417/36, 103/25
[51] Int. Cl. ........................................ G05b 13/00
[58] Field of Search ............. 318/482; 417/36, 45; 103/25; 307/118

[56] References Cited
UNITED STATES PATENTS

| | | | |
|---|---|---|---|
| 3,252,420 | 5/1966 | Sorensen | 417/36 |
| 3,351,084 | 11/1967 | Halkiades | 318/482 X |
| 3,408,941 | 11/1968 | Sorensen | 417/36 |
| 3,540,027 | 11/1970 | Rauth et al. | 417/36 X |
| 3,667,022 | 5/1972 | Quinn | 318/482 |

Primary Examiner—B. Dobeck

[57] ABSTRACT

A solid state control system for starting a sump pump motor when the water rises up to high level probes and for stopping the sump pump motor when the water level drops below low level probes. The system is supplied with power from an A.C. line. A.C. is applied to the probes to avoid polarization and half-wave rectified current is taken from the probes circuits to operate a transistor and an SCR in series connection, the SCR being supplied with rectified, smoothed and regulated D.C. to enable use thereof as a latch to keep the motor running while the water level falls from the high level probes below the low level probes. For isolation, a reed relay is used to fire a triac in the motor circuit when the SCR conducts.

7 Claims, 1 Drawing Figure

PATENTED MAR 26 1974
3,800,205
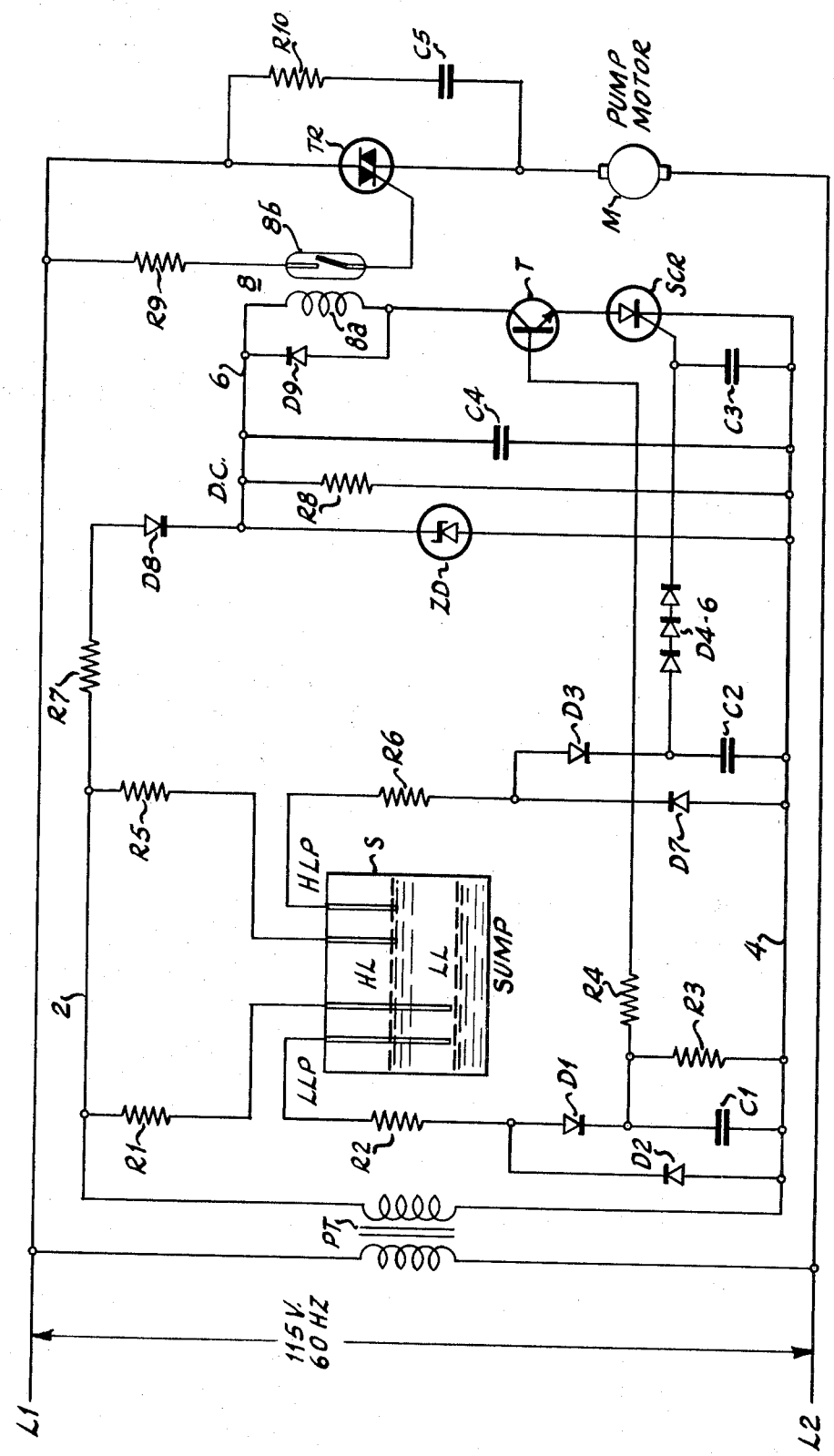

SUMP PUMP CONTROL SYSTEM

BACKGROUND OF THE INVENTION

Sump pump control systems have been known heretofore such as the float switch, pressure switch and probe control types. However, these prior control systems have been subject to one or more disadvantages such as lack of simplicity or reliability and the like. For example, the pressure switch type control requires a vented A.C. cord to afford atmospheric pressure on one side of the pressure switch diaphragm.

While these prior control systems have been useful for their intended purpose, this invention relates to improvements thereover.

SUMMARY OF THE INVENTION

This invention relates to sump pump control systems and more particularly to such systems of the solid state type.

An object of the invention is to provide an improved sump pump control system.

A more specific object of the invention is to provide an improved sump pump control system of the solid state type.

Another specific object of the invention is to provide a solid state sump pump control system that is simple in construction and reliable in operation.

Other objects and advantages of the invention will hereinafter appear.

BRIEF DESCRIPTION OF THE DRAWING

The drawing shows a schematic diagram of a solid state sump pump control system constructed in accordance with the invention.

DESCRIPTION OF THE PREFERRED EMBODIMENT

Referring to the drawing, there is shown a sump pump motor M powered from an alternating current source through power supply lines L1 and L2 under the control of a bidirectional thyristor triode such as a triac TR. The A.C. source may be 115 volts, 60 Hertz or the like as indicated on the drawing. Motor M is adapted to run a pump to pump water out of sump S. The triac is controlled by the triac control circuit in response to the water level as hereinafter described.

The triac control circuit is powered from the A.C. source through lines L1 and L2 and a transformer PT whose primary winding is connected across lines L1 and L2. The secondary winding of this transformer is connected across conductors 2 and 4 to supply the triac control circuit.

The water level in sump S is sensed by probes. For this purpose a pair of low level probes LLP are mounted in the sump so that their lower ends are held at a low level to be bridged by the water. A pair of high level probes HLP are mounted so that their lower ends are held at a high level to be bridged by the water.

The low level probes are connected in a low level detection circuit. This circuit comprises a current limiting resistor R1 connected from conductor 2 to one low level probe while the other low level probe is connected through a current limiting resistor R2, a unidirectional, capacitor charging diode D1 and a charging capacitor C1 and resistor R3 in parallel to conductor 4, with the junction between this diode and capacitor being connected through a resistor R4 to the base of a transistor T of the NPN conductivity type. A unidirectional diode D2 is connected from conductor 4 to the junction between resistor R2 and diode D1 to allow the other half-cycle of the A.C. to pass to the probes in shunt of capacitor C1.

The high level probes are connected in a high level detection circuit. This circuit comprises a current limiting resistor R5 connected from conductor 2 to one high level probe while the other high level probe is connected through a current limiting resistor R6, a unidirectional diode D3 and then through a series of three voltage dropping diodes D4-6, or the like, to the gate of a unidirectional thyristor triode such as an SCR, with the junction between diode D3 and diodes D4-6 being connected through a noise suppressing capacitor C2 to conductor 4. A unidirectional diode D7 is connected from conductor 4 to the junction between resistor R6 and diode D3 to allow the other half-cycle of the A.C. to pass through the probes to prevent polarization. A noise suppressing capacitor C3 is connected from the gate of the SCR to conductor 4.

A regulated direct current supply circuit is provided for the transistor and the SCR. This circuit comprises a connection from A.C. conductor 2 through a voltage dividing and rectifying circuit to conductor 2, this circuit having a resistor R7, a rectifying diode D8 and a clipping zener diode ZD in series. The junction between diodes D8 and ZD is connected to conductor 6 to supply D.C. thereto. A voltage smoothing circuit comprising a resistor R8 and a filter capacitor C4 in parallel is connected from conductor 6 to conductor 4 to provide smooth D.C. thereacross.

A firing circuit for triac TR is powered from D.C. conductors 6 and 4. This circuit comprises a coil 8a of a reed relay 8, transistor T and controlled rectifier SCR connected in series from conductor 6 to conductor 4, with the collector-emitter junction of the transistor and the anode-cathode junction of the SCR being in this circuit to control energization of the reed relay coil. A unidirectional diode D9 is in reverse-parallel connection with coil 8a to dissipate the induced voltage of the latter. A.C. power line L1 is connected through a current limiting resistor R9 and normally-open reed relay contact 8b to the gate of triac TR.

A dv/dt circuit having a resistor R10 and a capacitor C5 in series is connected across triac TR to slow down the rate of change of voltage across the latter thereby to avoid uncontrolled conduction therein.

OPERATION

When power is connected to lines L1 and L2, A.C. voltage is applied across triac TR, the rate of rise of this voltage being decreased by charging of capacitor C5 through resistor R10. Triac TR does not conduct because contact 8b is open.

A.C. voltage is also applied through transformer PT across conductors 2 and 4. On each positive half-cycle of this A.C. voltage current flows from conductor 2 through resistor R7, diode D8 and zener diode ZD to conductor 4. This current is limited by resistor R7, rectified by diode D8 and the D.C. voltage across conductors 6 and 4 is limited to a predetermined value by zener diode ZD. This voltage is smoothed by resistor R8 and capacitor C4 so that a regulated D.C. voltage appears across conductor 6 and 4. This D.C. voltage is applied across transistor T and controlled rectifier SCR which do not conduct yet.

The A.C. voltage on conductors 2 and 4 is applied across low level probes LLP. Assuming that the water in the sump has reached low level LL current will flow through the water across the low level probes. Thus, on each positive half-cycle of the A.C., current will flow from conductor 2 through resistor R1, across probes LLP, resistor R2, diode D1 and capacitor C1 to conductor 4 to charge this capacitor. On each negative half-cycle, current will flow from conductor 4 through diode D2, resistor R2, across probes LLP and resistor R1 to conductor 2. Thus, while capacitor C1 is charging due to current flow across the low level probes in one direction, diode D2 allows current to flow across the low level probes in the opposite direction to prevent polarization. This prevents the increase in resistance and counter-electromotive force which might otherwise occur due to polarization resulting from chemical action and change in concentration in the vicinity of the probes.

The A.C. voltage on conductors 2 and 4 is also applied across high level probes HLP. However, no current will flow because the water has not yet reached the high level HL.

When capacitor C1 has charged to a predetermined voltage level as determined by charge control resistor R3, this voltage is applied to the base of transistor T to bias it on. This enables the reed relay circuit so that it can thereafter be controlled by the SCR.

The water now continues rising under normal circumstances and eventually reaches high level HL. This allows current to flow on each positive half-cycle of the A.C. from conductor 2 through resistor R5, across probes HLP, resistor R6, diode D3 and diodes D4-6 to the gate of the SCR to fire this SCR into conduction. On each negative half-cycle of the A.C., current flows from conductor 4 through diode D7, across the high level probes HLP, and resistor R5 to conductor 2 to prevent polarization at the probes. Firing of the SCR allows current to flow from conductor 6 through reed relay coil 8a, transistor T and the SCR to conductor 4. This energizes the reed relay to close its contact 8b. This completes the gate circuit of triac TR through resistor R9 to fire the triac into conduction on both the positive and negative half-cycles of the A.C. As a result, A.C. power is applied to the motor to start the pump.

As the pump runs, the water level in the sump starts to decrease. When it drops below the high level probes HLP, the firing current is removed from the gate of the SCR. However, the SCR by its nature continues to conduct current as long as anode voltage is applied thereto and its anode-cathode current is above a minimum magnitude. Thus, the SCR functions as a latch to keep the pump operating while the water level drops from the high level to the low level LL.

When the water level drops to low level LL, it unbridges the low level probes to interrupt the charging circuit of capacitor C1. As a result, this capacitor starts to discharge by current flow through resistor R3 and its voltage decreases. When this voltage decreases to a low enough value, transistor T is turned off and interrupts the current flow through coil 8a of the reed relay, reopening contact 8b. As a result, triac TR stops conducting at the end of the half-cycle of A.C. and stops the pump motor. The SCR also turned off when transistor T interrupted the current therein and remains off until the water again reaches the high level.

The system now remains off until the water again rises. When it reaches the low level probes and continues up to the high level probes, the system operates again as hereinbefore described to cause the water to be pumped from the sump.

While the system hereinbefore described is effectively adapted to fulfill the objects stated, it is to be understood that the invention is not intended to be confined to the particular preferred embodiment of sump pump control system disclosed, inasmuch as it is susceptible of various modifications without departing from the scope of the appended claims.

I claim:

1. A sump pump motor control system comprising:
an A.C. source;
an A.C. switching device operable to control application of A.C. from said source to the motor to start the pump;
low level probes and high level probes in the sump for sensing low and high levels of water, respectively;

a low level circuit connecting A.C. from said source to said low level probes to provide current flow when the water rises to said low level probes while preventing unwanted polarization effects thereto;
A high level circuit connecting A.C. from said source to said high level probes to provide current flow when the water rises to said high level probes while preventing unwanted polarization effects thereat;
means connected to said A.C. source for providing a D.C. supply;
a triggering device for said A.C. switching device for triggering it into pump motor energizing state;
a controllable turn-on turn-off device;
a controlled unidirectional device controllable to latch into conducting condition until the power applied thereto is interrupted;
means connecting said controllable turn-on turn-off device and said controlled unidirectional device in series circuit to control application of power from said D.C. supply to said triggering device;
means for applying direct current from said low level circuit to said controllable turn-on turn-off device to bias it "on" whenever the water rises to the low level probes thereby to enable said series circuit for control by saud controlled unidirectional device when the water thereafter rises to the high level probes;
means for applying direct current from said high level circuit to said controlled unidirectional device to render it conducting when the water rises to the high level probes provided said controllable turn-on turn-off device has been biased on, thereby to energize said triggering device and start the pump;

said controlled unidirectional device remaining conducting when the water drops below the high level probes to maintain pumping;
and said controllable turn-on turn-off device being biased "off" when the water drops below the low level probes thereby to stop the pump.

2. The invention defined in claim 1, wherein:
said controllable turn-on turn-off device comprises a transistor;
and said means for applying direct current from said low level circuit to said controllable turn-on turn-off device comprises a unidirectional RC circuit having a resistor, a rectifying diode and a charging capacitor in series connection whereby the positive half-cycles of the A.C. source charge said capacitor, and means connecting the voltage of said capacitor to the base of said transistor.

3. The invention defined in claim 2, wherein said low level circuit comprises:
a unidirectionally conducting diode in reverse-parallel connection across said rectifying diode and said charging capacitor for passing the negative half-cycle of the A.C. source to the low level probes.

4. The invention defined in claim 1, wherein:
said controlled unidirectional device comprises an SCR;
and said means for applying direct current from said high level circuit to said controlled unidirectional device comprises a unidirectionally conducting circuit having a rectifying diode and means connecting it to the gate of said SCR to conduct the positive half-cycles of the A.C. source thereto.

5. The invention defined in claim 4, wherein said high level circuit comprises:
a unidirectionally conducting diode in reverse-parallel connection with said rectifying diode for passing the negative half-cycles of the A.C. source to the high level probes.

6. The invention defined in claim 1, wherein said triggering device comprises:
a reed relay having an energizing coil in said series circuit and having a contact for controlling said A.C. switching device thereby to isolate the control circuit from the power circuit.

7. The invention defined in claim 6, wherein said A.C. switching device comprises:
a triac having main conduction terminals in the motor circuit and having a gate controlled by said reed relay contact.

* * * * *